US011111868B2

United States Patent
Taglialatela Scafati (10) Patent No.: US 11,111,868 B2
(45) Date of Patent: Sep. 7, 2021

(54) METHOD OF EXHAUST GAS MANAGEMENT IN INTERNAL COMBUSTION ENGINES, CORRESPONDING SYSTEM, ENGINE, VEHICLE AND COMPUTER PROGRAM PRODUCT

(71) Applicant: STMICROELECTRONICS S.R.L., Agrate Brianza (IT)

(72) Inventor: Ferdinando Taglialatela Scafati, Naples (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 92 days.

(21) Appl. No.: 16/058,770

(22) Filed: Aug. 8, 2018

(65) Prior Publication Data

US 2019/0048810 A1 Feb. 14, 2019

(30) Foreign Application Priority Data

Aug. 10, 2017 (IT) .......................... 102017000092925

(51) Int. Cl.
F02D 41/00 (2006.01)
F02D 41/14 (2006.01)

(52) U.S. Cl.
CPC ....... *F02D 41/005* (2013.01); *F02D 41/1405* (2013.01); *F02D 41/1467* (2013.01); *F02D 41/0072* (2013.01)

(58) Field of Classification Search
CPC ............... F02D 41/005; F02D 41/1405; F02D 41/1467; F02D 41/0072
(Continued)

(56) References Cited

U.S. PATENT DOCUMENTS 9,638,120 B2 * 5/2017 Okada .................... F01N 3/0842
2004/0006978 A1 * 1/2004 Beck ........................ F01N 3/043
60/289

(Continued)

FOREIGN PATENT DOCUMENTS

WO 2004/003353 A1 1/2004

OTHER PUBLICATIONS

Alger et al., "The Impact of Cooled EGR on Peak Cylinder Pressure in a Turbocharged, Spark Ignited Engine," *SAE Int. J. Engines* 8(2):455-463, 2015. (10 pages).
Catania et al., "Real-Time Calculation of EGR Rate and Intake Charge Oxygen Concentration for Misfire Detection in Diesel Engines," *SAE International*, Technical Paper 2011-24-0149, Sep. 11, 2011. (12 pages).
(Continued)

*Primary Examiner* — Logan M Kraft
*Assistant Examiner* — John D Bailey
(74) *Attorney, Agent, or Firm* — Seed IP Law Group LLP (57) ABSTRACT

A method of controlling exhaust gas recirculation in the internal combustion engine includes: sensing one or more sensing signals indicative of operating conditions of an internal combustion engine, producing, as a function of the sensing signal or signals sensed, an exhaust gas recirculation control signal for controlling exhaust gas recirculation in the internal combustion engine, producing, e.g., via a "virtual" sensor including a neural network, a particulate size distribution signal indicative of the particulate size distribution in the exhaust of the internal combustion engine, correcting the exhaust gas recirculation control signal as a function of the particulate size distribution control signal, thereby producing a corrected exhaust gas recirculation control signal, and controlling exhaust gas recirculation in the internal combustion engine as a function of the corrected exhaust gas recirculation control signal.

21 Claims, 5 Drawing Sheets

(58) Field of Classification Search
USPC .......................................................... 123/672
See application file for complete search history.

(56) References Cited

U.S. PATENT DOCUMENTS

| | | | | |
|---|---|---|---|---|
| 2006/0212209 | A1* | 9/2006 | Cesario | F02D 41/1405 701/106 |
| 2007/0250251 | A1* | 10/2007 | Green, Jr. | F02D 35/023 701/105 |
| 2010/0242455 | A1* | 9/2010 | Konstandopoulos | F01N 13/0093 60/311 |
| 2010/0242457 | A1* | 9/2010 | Konstandopoulos ... | F01N 11/00 60/311 |
| 2012/0014838 | A1* | 1/2012 | Yasui | G05B 13/041 422/105 |
| 2012/0117954 | A1* | 5/2012 | Yasui | F01N 3/208 60/301 |
| 2013/0174641 | A1* | 7/2013 | Asano | G01N 1/2252 73/23.31 |
| 2013/0298526 | A1* | 11/2013 | Wang | F02D 41/0025 60/274 |
| 2014/0000239 | A1* | 1/2014 | Swoish | F01N 3/021 60/274 |
| 2014/0109883 | A1* | 4/2014 | Zhu | F02D 41/1402 123/568.11 |
| 2015/0285173 | A1* | 10/2015 | Lundstedt | F02D 41/0285 701/102 |
| 2016/0230684 | A1* | 8/2016 | Surnilla | F02D 41/0065 |
| 2017/0030322 | A1* | 2/2017 | Glugla | F02P 5/15 |
| 2017/0168466 | A1* | 6/2017 | Sun | G05B 13/048 |
| 2017/0268412 | A1* | 9/2017 | Engelfried | F02D 41/107 |
| 2018/0313286 | A1* | 11/2018 | Haga | F02D 41/1486 |
| 2018/0347503 | A1* | 12/2018 | Kuzuyama | F02D 41/009 |

OTHER PUBLICATIONS

Foresee et al., "Gauss-Newton Approximation to Bayesian Learning," *Proceedings of International Conference on Neural Networks (ICNN'97)*, Houston, Texas, USA, Jun. 12, 1997, pp. 1930-1935.

Hoard et al., "Diesel EGR Cooler Fouling," *SAE International Journal of Engines* 1(1):1234-1250, 2009. (18 pages).

Johnson, "Diesel Emission Control in Review," *SAE International World Congress*, Detroit, Michigan, USA, Apr. 14-17, 2008. (16 pages).

Klein et al., "Real-Time Estimation of the Exhaust Gas Recirculation Ratio Based on Cylinder Pressure Signals," *SAE International World Congress*, Detroit, Michigan, USA, Apr. 16-19, 2007. (11 pages).

MacKay, "Bayesian Interpolation," *Neural Computation* 4:415-447, 1992.

Maing et al., "Simulation of the EGR cooler fouling effect on NOx emission of a light duty diesel engine," *Korean Society of Automotive Engineers Autumn Conference*, Tŏksan, South Korea, Nov. 22-24, 2007, pp. 214-220. (8 pages).

Mörsch et al., "Investigation of Alternative Methods to Determine Particulate Mass Emissions," OICA Contribution to the Particulate Measurement Program—Technical Annex: DaimlerChrysler AG, Jan. 2003. (8 pages).

Scafati et al., "Soft Computing Model for Prediction of EGR Effects Boosted PFI SI Engine," *8th International Conference on Engines for Automobile*, SAE International, Capri, Naples, Italy, Sep. 16-20, 2007. (10 pages).

Zhang et al., "Adaptive EGR Cooler Pressure Drop Estimation," *SAE International World Congress*, Detroit, Michigan, USA, Apr. 14-17, 2008. (7 pages).

Zheng et al., "Diesel engine exhaust gas recirculation—a review on advanced and novel concepts," *Energy Conversion and Management* 45:883-900, 2004.

\* cited by examiner

METHOD OF EXHAUST GAS MANAGEMENT IN INTERNAL COMBUSTION ENGINES, CORRESPONDING SYSTEM, ENGINE, VEHICLE AND COMPUTER PROGRAM PRODUCT

BACKGROUND

Technical Field

The description relates to exhaust gas management in internal combustion engines.

One or more embodiments may apply to controlling pollutant emissions from motor vehicles.

Description of the Related Art

In recent years, depletion of fossil fuels and pollutant emissions, such as nitrous oxides (NOx) and particulate matter (PM), and emissions of carbon dioxide ($CO_2$) (one of the greenhouse gases) as well have been the source of increasing concern.

Diesel engines are widely used throughout Europe due to their higher thermal efficiency, which facilitates reducing fuel consumption and slowing down global warming. Diesel engines otherwise represent a major source of NOx and PM in urban areas.

Various epidemiological studies such as, e.g.:

Ostro, B. D.: "Air pollution and morbidity: a sensitivity analysis of alternative monitors, pollutants, and averaging times," Sci. Total Environ. 39(1-2):111-24, 2008;

Douglas, W., Dockery, C., Pope, A., Xu, X., et al.: "An Association between Air Pollution and Mortality in Six U.S. Cities," N Engl. J Med; 329:1753-1759, 1993; Lee, J., T., Son, J., Y., Kim, H., and Kim, S., Y.: "Effect of air pollution on asthma-related hospital admissions for children by socio-economic status associated with area of residence," Archives of Environmental and Occupational Health; 61(3):123-130, 2006, indicate that small particles may have a negative effect on human health.

Specifically, toxicity was found to increase as the particle size decreases. Fine particles may exhibit considerably higher toxicity per unit mass as compared to coarser particles. Furthermore, smaller particles are more likely to be inhaled and deposited in the respiratory tract and in the alveolar region by diffusion, causing respiratory diseases, inflammation, and damage to the lungs: see, e.g.: Donaldson, K., Li, X. Y., and MacNee, W.: "Ultrafine (Nanometer) Particle Mediated Lung Injury," J. Aerosol Sci. 29:553-560.

For that reason, stringent standards have been introduced in respect of emissions: EURO 6 rules (see, e.g., REGULATION (EC) No. 715/2007) are exemplary of these.

Various solutions for reducing NOx and PM emissions have been devised in order to comply with more stringent requirements in environmental regulations.

Exhaust gas recirculation (EGR) technology is now extensively used in order to reduce NOx emissions: see, e.g., Zheng, M., Reader, G. T., and Hawley, J. G.: "Diesel engine exhaust gas recirculation: a review on advanced and novel concepts," Energy Conversion & Management 45: 883:900, 2004.

EGR acts by reducing the in-cylinder temperature and the oxygen available in the cylinder, which may lead to an increase in particulate matter (PM). In fact, particulate particles are formed in the cylinder in the locally rich regions.

Conventional engine control systems may adopt control maps to provide a desired value of EGR ratio as a function of the (instantaneous) values of certain engine parameters, such as angular speed and load, by pursuing a trade-off between NOx and smoke emissions. That is, in defining the engine control maps set by a manufacturer during calibration of an engine, the EGR percentage for each engine condition can be selected in such a way to achieve a certain balance between NOx and particulate emissions (taken as the total mass of particulate matter) by noting that an increase in the EGR percentage leads to a reduction in NOx emissions and an increase in particulate emissions. For that reason a sort of compromise is sought between these opposing factors.

Moreover, deposition of particles can occur on the wall of the EGR cooler and on the EGR valve. This changes the real EGR ratio with respect to a nominal desired one.

It was observed that this may decrease NOx reduction efficiency and have a negative effect on PM emissions; see, e.g.:

Hoard, J., Abarham, M., Styles, D. and Giuliano, J. M. et al.: "Diesel EGR Cooler Fouling," SAE Technical paper 2008-01-2475, 2008, doi:10.4271/2008-01-2475;

Zhang, F. and Nieuwstadt, M.: "Adaptive EGR Cooler Pressure Drop Estimation," SAE Technical paper 2008-01-0624, 2008, doi: 10.4271/2008-01-0624;

Maing, S., Lee, K. S., Song, S., Chun, K. M., et al.: "Simulation of the EGR Cooler Fouling Effect on NOx Emission of a Light Duty Diesel Engine," KSAE07-F0035, pp. 214-220, 2007;

Johnson, T. V., "Diesel Emission Control in Review," SAE Technical paper 2008-01-0069, 2008, doi: 10.4271/2008-01-0069.

OBJECT AND SUMMARY

Despite the extensive activity discussed in the foregoing, improved solutions are desirable in order to address various issues as outlined above.

One or more embodiments may relate to a corresponding system, a corresponding internal combustion engine as well as to a corresponding vehicle.

One or more embodiments may relate to a computer program product loadable in the memory of at least one data processing circuit (e.g., a computer or controller) and including software code portions implementing the method of one or more embodiments. As used herein, reference to such a computer program product is understood as being equivalent to reference to a non-transient computer-readable medium containing instructions for controlling a programmable data processing circuit in order to co-ordinate implementation of a method according to one or more embodiments. Reference to "at least one programmable data processing circuit" is intended to highlight the possibility for one or more embodiments to be implemented in modular and/or distributed form.

The claims are an integral part of the technical teaching provided herein in respect of the embodiments.

One or more embodiments can provide a real-time control system configured for acting on the amount of re-circulated exhaust gas (EGR) in order to improve particle sizing in the exhaust gases from an internal combustion engine.

One or more embodiments provide a control architecture which facilitates real-time monitoring of particulate particle characteristics by means of a neural network configured to operate as a "virtual" sensor.

In one or more embodiments, such a sensor can provide concentrations of particles with a specific aerodynamic diameter as an output.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

The prior art control strategies do not take into account the effect of the EGR ratio on particle size and number, which is regulated along with mass. That is, they do not take into account the effect of the EGR on the number of particles emitted and their size, while the number of particles is governed by standards such as Euro 6 standards and will expectedly become even more stringent in future regulations.

One or more embodiments as exemplified herein aim at achieving an improved control of particulate matter (PM) emissions, also in terms of particle size and number.

It was noted that real-time information about the characteristics of the emitted particulate may be beneficial in that respect.

One or more embodiments may adopt for that purpose a "virtual" sensor based on an artificial neural network (ANN) paradigm.

ANNs are data-processing systems somehow patterned after biological neural systems which have been already used in various areas of science and engineering where conventional modeling methods may be inadequate due, for instance, to the presence of highly nonlinear phenomena. In fact, ANNs possess the ability of "learning" what happens within the framework of a certain process without requiring any modeling of the underlying physical and chemical laws. Also, predictions as provided by a well-trained ANN can be (much) faster than those obtainable via conventional simulation programs or mathematical models.

One or more embodiments may involve a closed-loop control system that facilitates real-time managing the particle sizing in the exhaust gases of an internal combustion engine by using a neural network virtual sensor.

Certain experimental observations may be helpful in understanding the principles underlying one or more embodiments. As reported herein these experimental observations are primarily for explanatory purposes and are not intended to be construed, even indirectly, as limitative of the embodiments.

These observations were made on a four-stroke FIAT 1910 JTD diesel engine, with four in-line cylinders, 16 valves, a displacement of 1.91 and a compression ratio of 17.5:1. The engine was equipped with a common rail injection system, which allowed two injections (pilot-main) for each cycle (Unijet). An in-cylinder pressure signal was measured at each engine cycle by means of a piezoelectric pressure transducer. A high precision crank angle encoder was used for angle-based measurements. Flywheel generated trigger and crank angle degree marker pulses were produced with a 0.05 crank angle degree (CAD) resolution; 150 cycles of pressure data were recorded on 0.1° crank angle resolved basis for each operating condition using an AVL Indimodul system.

Integrated combustion parameters (e.g., heat release, IMEP) were calculated by integrating the in-cylinder pressure data. The experiments were performed using diesel fuel commercially available in Italy at the time of filing the instant application with a sulphur content lower than 250 ppm.

The engine E was provided with an exhaust gas recirculation (EGR) system as adapted to be installed in a motor vehicle V such as a motor car (see also FIG. 5, to be discussed later).

Figure 5:
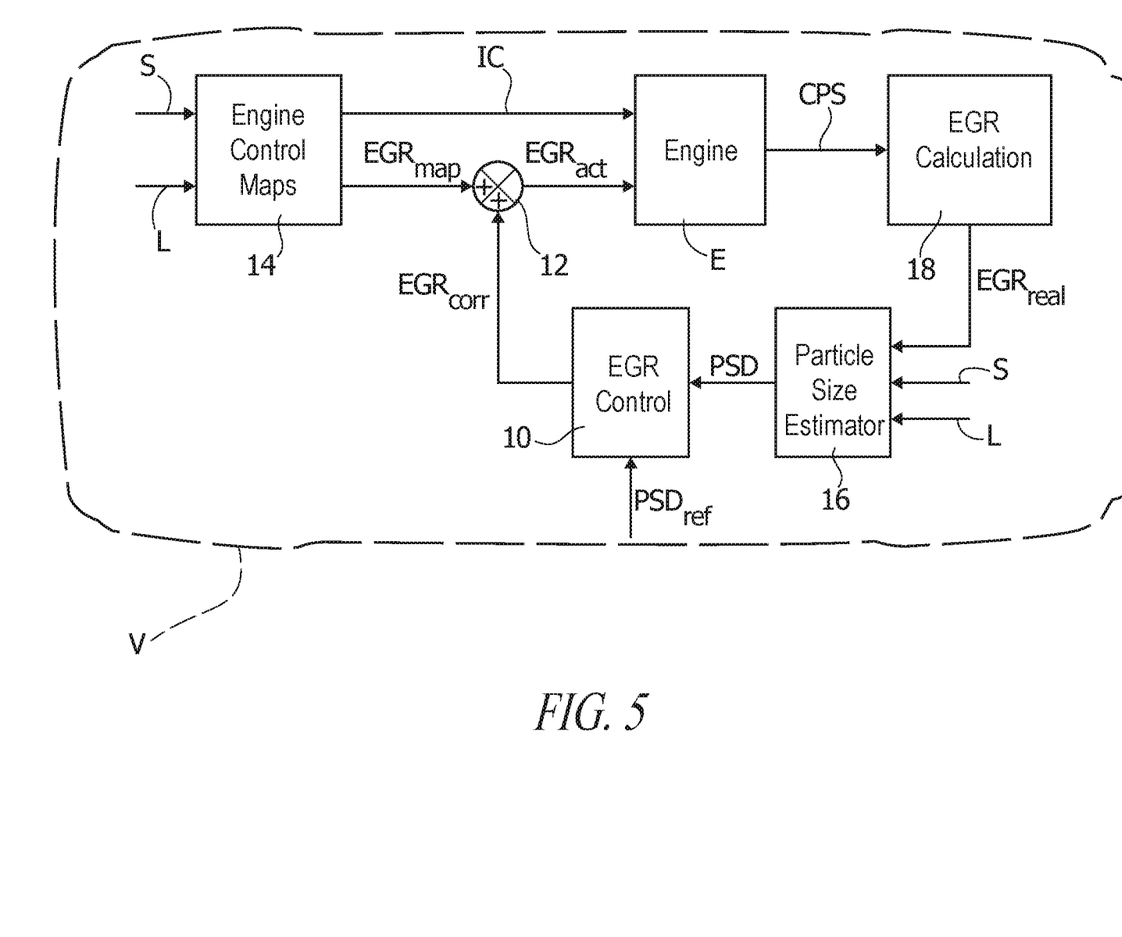
FIG. 5 is a block diagram exemplary of a control architecture based on embodiments and adapted for use in a motor vehicle.

An associated EGR circuit includes an electro-valve controlled by an electronic control unit (EGR controller as exemplified by 10 in FIG. 5). The electro-valve receives an electrical signal (duty cycle) and can produce a pressure reduction in an associated mechanical valve (EGR valve) between the outlet and the inlet pipes. With pressure reduction applied, the EGR valve facilitates the addition of a part of exhaust gases to the airflow.

The whole process can be controlled by the electronic control unit 10 on the basis of characteristic look-up tables, e.g., as stored in a memory.

According to a conventional definition as provided, e.g., in Mörsch, O. and Sorsche, P., (DaimlerChrysler AG): "Investigation of Alternative Methods to Determine Particulate Mass Emissions" accessible at oica.net/wp-content/uploads/annex-5-4-daimlerchrysler.pdf, the actual EGR percentage can be obtained by measuring the aspirated air ($\dot{m}$) with and without EGR and using the following equation:

$$EGR\ \% = 1 - \frac{\dot{m}_{airwEGR}}{\dot{m}_{airw/oEGR}} \cdot \frac{p_{w/oEGR}}{p_{wEGR}} \cdot \frac{T_{wEGR}}{T_{w/oEGR}}.$$

The presence of exhaust gases in the inlet manifold does not imply the same reduction of the aspirated fresh air. This is due to the contribution of thermal energy by exhaust gases; this leads to an increase of the aspirated fluid temperature and therefore to its expansion.

Steady-state measurements of carbon monoxide (CO), $CO_2$, oxygen ($O_2$), hydrocarbons (HC), and NOx were carried out in the raw exhaust by means a DiGas4000 commercial analyzer by AVL.

CO, $CO_2$ and HC were measured by non-dispersive infrared detectors (NDIR); NOx and $O_2$ were detected by means of an electrochemical sensor.

An opacimeter was used to measure particulate mass concentration as a function of time. An opacimeter is a partial-flow system that measures the visible light attenuation (550 nm) from the exhaust gases. The instrument used had a 1-second resolution. The opacity percentage can be converted into particulate mass concentration by means of empirical relationships.

Aerosol size distributions at the common rail diesel engine exhaust were evaluated by means of an electrical low pressure impactor (ELPI), which is an electrical impactor working at low pressure and capable of measuring real-time particle aerodynamic diameters in the range 7 nm-10 µm.

In ELPI, a sample first passes through a unipolar positive polarity charger where the particles are electrically charged by ions produced in a corona discharge. After the charger, the particles pass on to a low-pressure impactor where they are classified according to their aerodynamic diameter. The stages of the impactor are electrically insulated and each stage is individually connected to an electrometer current amplifier. The charged particles collected in a specific impactor stage produce an electrical current, which is recorded by the respective electrometer channel. The current value of each channel is proportional to the number of particles collected, and thus to the particle concentration in the specific size range. The current values are converted to an aerodynamic size distribution using particle size dependent relationships which describe the properties of the charger and the impactor stages.

Upstream of ELPI, a two-step dilution fine particle sampler (FPS) was placed. FPS allows to sample and control dilution ratio and temperature of exhaust gas.

During the experiments, the common rail diesel engine was run steady state at different operating conditions. In particular, engine angular speeds of 1000, 1500 and 2000 rpm were considered. The load was changed in the range 2-5 bar. EGR percentage was varied from 0 to 56% for each condition, without changing the pilot and main fuel injection strategy. In this way, the air-fuel ratio decreases with an increasing EGR due to the displacement of intake air.

Figure 1:
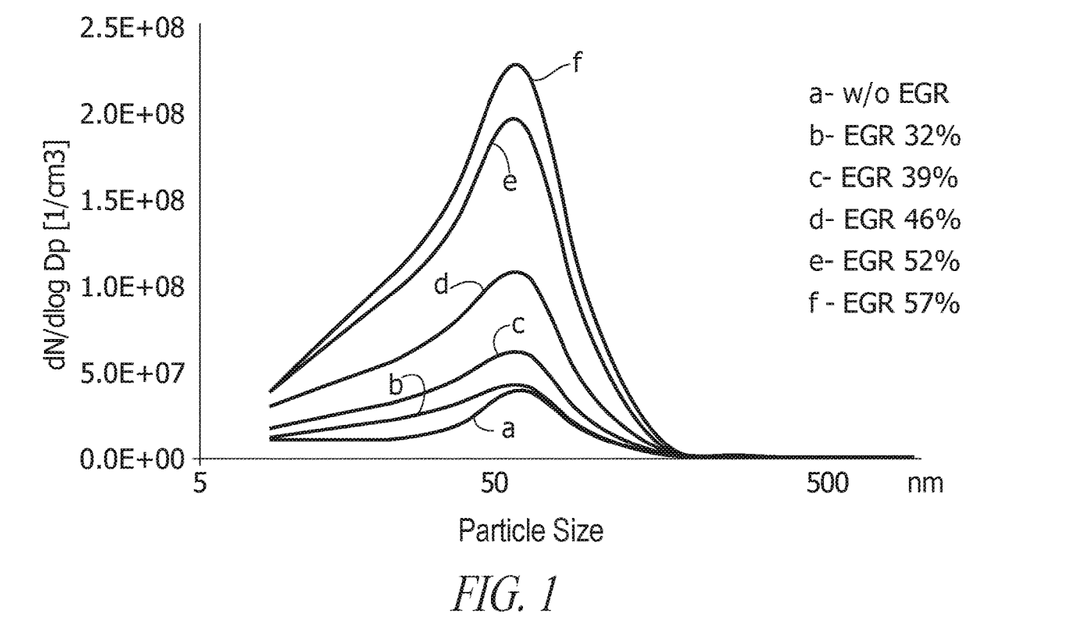
FIG. 1 is a diagram exemplary of particle size distributions measured for different EGR ratios.

FIG. 1 shows the particle size distribution (abscissa scale, in nm; 1 nm=$10^{-9}$ m) measured at the exhaust of the test engine (engine speed 1500 rpm, torque 30 Nm) for different EGR ratios, denoted a) to f).

The ordinate scale in FIG. 1 is in dN/d Log Dp, namely the particle density expressed as the number of particles per cubic centimeter having a certain aerodynamic diameter D.

Observation of FIG. 1 indicates that EGR does not significantly affect the particle size distribution, which for all the cases shows a sort of uni-modal behavior.

It was otherwise observed that an increase in EGR produces an increase in the number concentration (that is the number of particles per volume unit).

Figure 2:
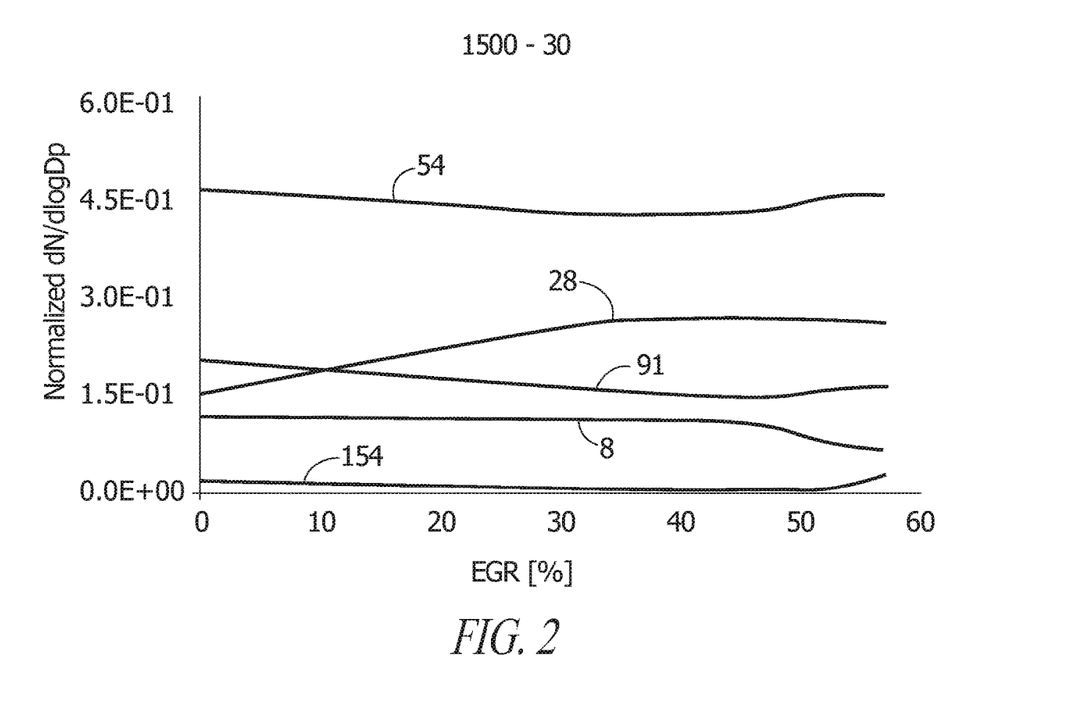
FIGS. 2 to 4 are diagrams exemplary of particle number concentration as a function of EGR level measured for various engine speed and torque values.
Figure 3:
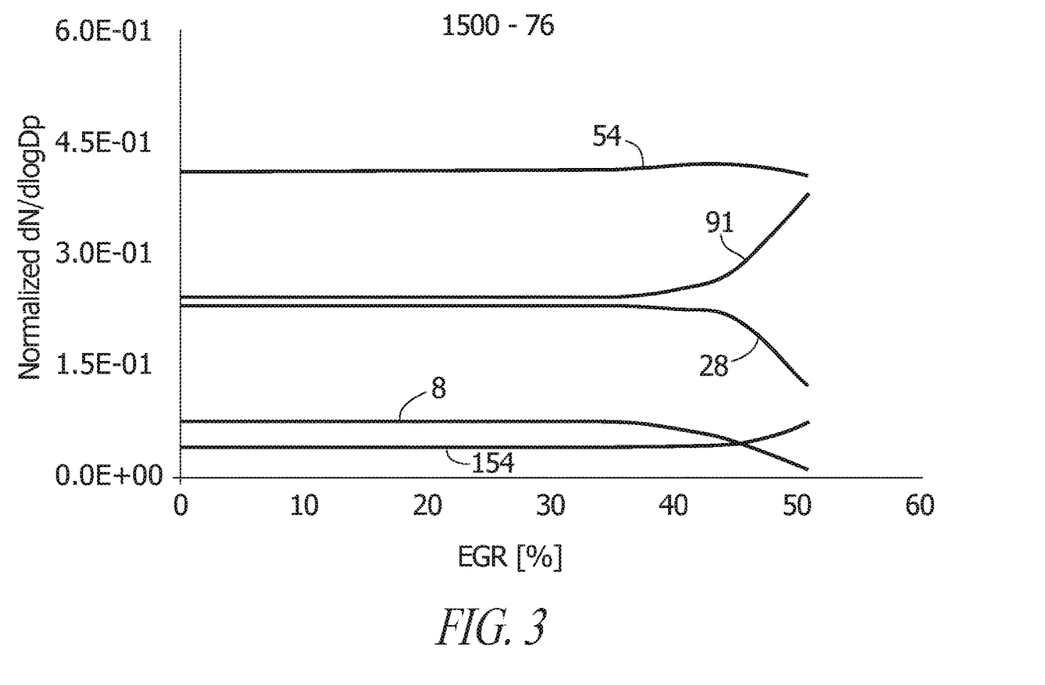
Figure 4:
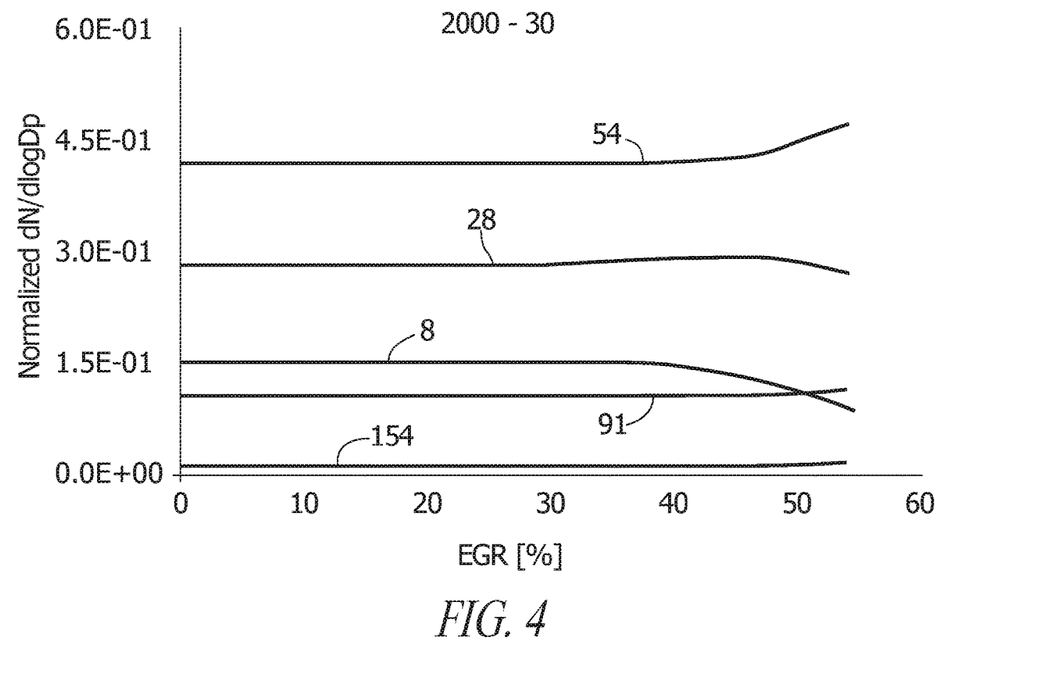

In FIGS. 2 to 4, the (normalized) particle number concentration dN/d Log Dp is depicted as a function of the EGR level, for different particle sizes (8, 28, 54, 91 and 154 nm; 1 nm=$10^{-9}$ m) and for different running conditions, namely:

engine speed 1500 rpm, torque 30 Nm (FIG. 2);
engine speed 1500 rpm, torque 76 Nm (FIG. 3);
engine speed 2000 rpm, torque 30 Nm (FIG. 4);

It was observed that in the various operative conditions considered, the number of particles smaller than 28 nm initially slightly increased with EGR and then decreased for higher EGR ratios. Particles in the size range 54-154 nm were found to globally increase with the EGR ratio, with the rate of increase markedly dependent on the EGR level.

Even without wishing to be bound to any specific theory in that respect, the different behavior observed for small and large particle classes can be expectedly ascribed to the effect of EGR on particle formation: particle formation is prompt in all the size ranges; however, the formation of larger particles is enhanced at lower temperatures, which boost growth processes such as coagulation and agglomeration, and with a lower presence of oxygen, which improves particle formation and reduces particle oxidation. This result appears to become more evident as the EGR increases.

The above considerations indicate that EGR level can be effectively used as a control variable in a system intended to facilitate reducing the amount of particles having smaller dimensions.

One or more embodiments may involve a dedicated closed-loop control architecture capable of improving the characteristics of particulate emissions from internal combustion engines, e.g., by reducing the concentration of ultra-fine and nano-particles.

In one or more embodiments aerosol size distribution as predicted by means of a neural network model can be used as the input value. The control variable is represented by the amount of exhaust gas (EGR) recirculated to the engine E.

An exemplary block diagram of such a control architecture is shown in FIG. 5.

In the exemplary block diagram of FIG. 5 the EGR controller 10 produces a correction term EGRcorr which is used to adjust (e.g., at a summation node 12) an EGR value EGRmap defined by engine control maps 14 in order to achieve a desired aerosol sizing.

As exemplified in FIG. 5, such a correction can occur, e.g., at a summation node 12, so that an actual EGR value, EGRact is supplied to the engine E resulting from correction of EGRmap by means of EGRcorr.

The EGR value EGRmap can be defined by the engine control maps 14 e.g., as a function of signals indicative of engine speed (signal S) and engine load (signal L). Sensing of those signals and processing thereof by the engine control maps 14 to produce the EGR value EGRmap (e.g., in conjunction with injection commands IC to be similarly supplied to the engine E) are conventional in the art, thus making it unnecessary to provide a more detailed description herein.

In one or more embodiments, the EGR controller 10 may be configured to provide the EGRcorr value on the basis of a particulate size distribution signal PSD predicted in real time by a particle size distribution estimator 16 including a neural network (e.g., an artificial neural network—ANN).

For instance, the EGR controller 10 may operate by increasing or reducing the EGRmap level (e.g., by adding or subtracting EGRcorr at the node 12) with the aim of obtaining a target value for the particulate size distribution signal PSD.

In one or more embodiments, a target value for PSD (denoted PSDref) can be selected with the aim of reducing the concentration of ultra-fine and nano-particles. This may be intended to reduce their adverse effect on human health, but can also facilitate adapting the particle size to the characteristics of the particulate trap (not visible in figures) acting on the engine exhaust.

In one or more embodiments, other factors may come into play in the definition of a desired EGR ratio by the EGR controller 10.

For instance, an increase in exhaust gas recirculation may lead to an increase in smoke and particulate (PM) emissions, especially at high load. For EGR ratios greater than 40-50% the increase in PM emissions may be sharp. This can be taken into account in the calculation of the EGR correction term EGRcorr in the EGR controller 10. Similarly, the potential effect of EGR level correction on NOx emissions and engine performance may be taken into account.

The foregoing may take place in a manner known per se, so that a corresponding description will not be provided here for brevity.

In one or more embodiments the neural network which implements the PSD model (as exemplified at 16 in FIGS. 5 and 6) provides, for a given engine operating condition, information about the characteristics of particulate emissions in terms of particle size distribution, thus operating as a virtual sensor.

Figure 6:
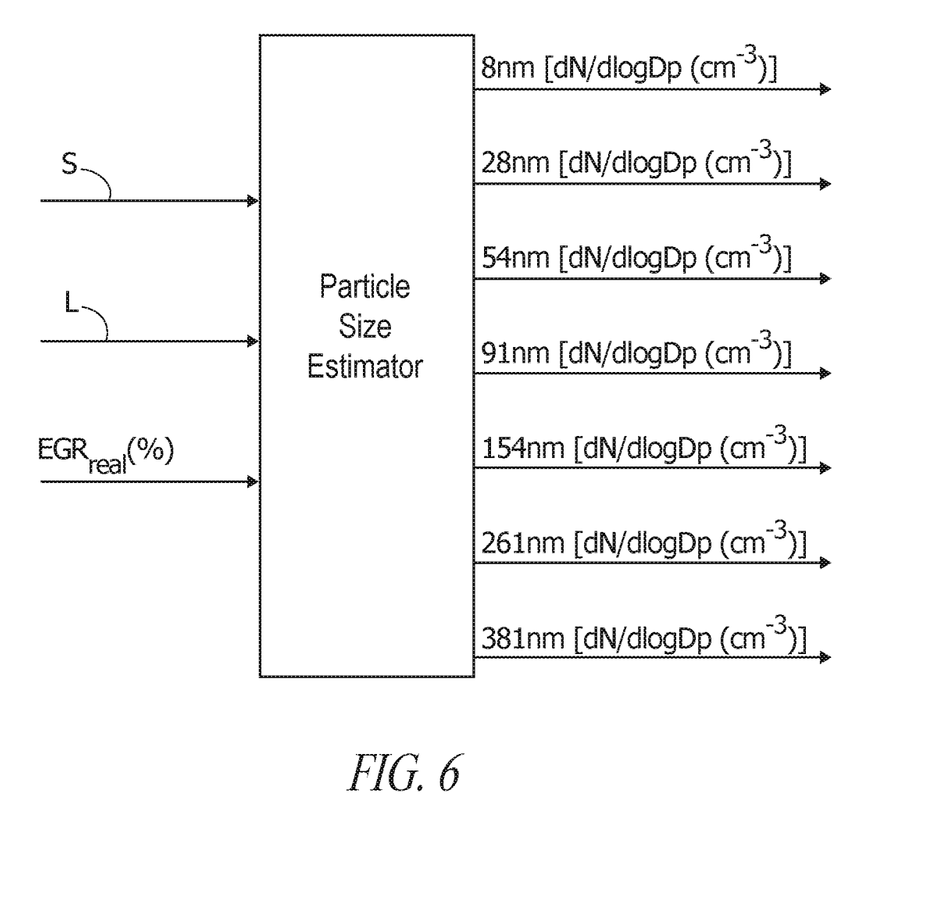
FIG. 6 is a schematic representation of a "virtual" sensor based on a neural network.

A virtual sensor as exemplified herein operates on the basis of the engine speed and load signal S and L (as sensed and provided—in manner known per se—to the control maps 14) plus a "real" value for the EGR, that is EGRreal (e.g., in percentage EGR %) as calculated in a EGR calculation block 18 coupled to the engine E.

In one or more embodiments, by acting a virtual sensor operating on the signals S, L and EGRreal, the neural network predictor 16 produces as an output concentrations of particulate particles with certain (fixed) aerodynamic diameters such as, e.g., 8 nm, 28 nm, 54 nm, 91 nm, 154 nm, 261 nm e 381 nm. (1 nm=$10^{-9}$ m). Of course, i) the choice of seven diameter values and ii) the numerical figures given are purely exemplary and are not to be construed, even indirectly, in a limiting sense of the embodiments.

In one or more embodiments as exemplified herein, rather than the nominal EGR level EGRmap resulting from the engine control maps 14, the actual EGR ratio from the block 18 is input to the predictor 16. This latter choice can take into account the fact that the amount of exhaust gas recirculated in the intake manifold may differ appreciably from the nominal value as output from engine control maps. This may be due to deposition of particulate on the walls of EGR valve and EGR cooler and to ageing effects of the EGR valve itself.

Authors such as:

Catania, A., et al.: "Real-Time Calculation of EGR Rate and Intake Charge Oxygen Concentration for Misfire Detection in Diesel Engines," SAE Technical Paper 2011-24-0149, 2011, doi:10.4271/2011-24-0149;

Alger, T., et al.: "The Impact of Cooled EGR on Peak Cylinder Pressure in a Turbocharged, Spark Ignited Engine," SAE Int. J. Engines 8(2):455-463, 2015, doi:10.4271/2015-01-0744;

Klein, P. et al.: "Real-Time Estimation of the Exhaust Gas Recirculation Ratio Based on Cylinder Pressure Signals," SAE Technical Paper 2007-01-0493, 2007, doi:10.4271/2007-01-0493;

have demonstrated that, both for diesel and spark-ignited engines, the actual EGR level can be obtained by processing an in-cylinder pressure signal.

For that reason, a control architecture for real-time particle sizing management as exemplified in FIG. 5 includes a block 18 for extracting information about the actual EGR value, e.g., from a combustion pressure signal CPS from the engine E.

The signal CPS can be provided by an in-cylinder pressure sensor, which is a sensor already present in many modern diesel engines.

In one or more embodiments, the AN-based predictor 16 can be devised by taking into account the paradigm of a learning machine trained and tested on experimental data.

In one or more embodiments, a feed-forward MLP (multi-layer perceptron) neural network with one hidden layer can be adopted as the learning model.

The generalization capability of the neural network model can be improved by resorting to an automated regularization procedure applied during model training.

Bayesian regularization as described, e.g., in

MacKay D. J. C.: "Bayes Interpolation," Neural Computation, vol. 4, no. 3, pp. 415-447, 1992;

Foresee, F. F., et al.: "Gauss-Newton approximation to Bayesian regularization," Proceedings of the 1997 International Joint Conference on Neural Networks, pp. 1930-1935, 1997 is exemplary of such a procedure which can be used in one or more embodiments.

Basically, a regularization procedure facilitates a smoother network response through a modification in the object function, e.g., by adding a residual term including the sum of squared weights of the network.

According to Bayes' rule, a "best" model can be defined as the model with the highest a posteriori probability of being correct; that is:

$$\min_{\theta}(-\log(P(D\mid H_\theta)-\log(P(H_\theta))$$

where $\theta$ is the parameter of the model $H_\theta$ used to describe a system, whose observed event is indicated with D.

In the equation above, $P(D|H_\theta)$ is the probability of the event conditioned by the correctness of the model. In the context of a neural network model, the observed event of the system is:

$$D=\{(\bar{x}^i,\bar{y}_i)|i=1,\ldots,n\},$$

where $\bar{x}^i$ is the i-th input vector of the neural network model and $\bar{y}_i$, is the related i-th output vector used as data set for the model training.

The neural network can be described as a non-linear map $g_\theta$ which couples the input-output data as a function of the weights and bias values (described by the vector $\theta$) of the neurons in the hidden layer as per the following equation below:

$$\bar{y}_i=g_\theta(\bar{x}^i)$$

In a Bayesian approach, a normal Gaussian data distribution can be considered only if the model is correct.

If $\theta$ is a correct parameter vector, the observed values $y_i$ are normally distributed around $g_\theta(\bar{x}^i)$.

By simple calculations:

$$-\log(P(D\mid H_\theta))=-\log\prod_{i=1}^{n}e^{-\frac{(\bar{y}_i-g_\theta(\bar{x}^i))^2}{2r^2}}==\frac{1}{r^2}\sum_{i=1}^{n}\frac{1}{2}(\bar{y}_i-g_\theta(\bar{x}^i))^2$$

Consequently a function suited to be used as a (minimization) target during the training phase of the model is:

$$\min_\theta \left( \sum_{i=1}^{n} \frac{1}{2}(\overline{y}_i - g_\theta(\overline{x}^i))^2 - r^2 \log(P(\theta)) \right)$$

where $-r^2 \log(P(\theta))$ represents a kind of a priori information about the correct solution.

Table 1 reproduced below is exemplary of possible performance of a PSD (particulate size distribution) model in the estimation of particle size distribution, when applied to a testing set as discussed previously.

TABLE 1

| Particle diameter (nm) | Absolute mean square error (cm$^{-3}$) | Mean square error (%) |
|---|---|---|
| 8 | 5.0E+06 | 6 |
| 28 | 1.02E+07 | 4.4 |
| 54 | 2.36E+07 | 3.1 |
| 91 | 1.30E+07 | 4.3 |
| 154 | 2.14E+06 | 3.8 |
| 261 | 5.11E+05 | 3.3 |
| 381 | 2.51E+05 | 6 |

Table 1 shows the absolute and relative mean square errors of the model in estimating the concentrations of particles with diameters of 8, 28, 54, 91, 154, 261 and 381 nm. The mean square error was found always to lie within the range 3-6% of the highest experimental data.

The (purely exemplary) results reported in Table 1 refer to a data set including 38 experimental points. The whole data set was divided in training and testing sets, including 28 and 10 experimental points, respectively. Training data were chosen in order to contain information spread evenly over the entire range of engine operative conditions, thus increasing the generalization capability of the neural network model. The number of neurons in the hidden layer was set equal to 5.

This shows a satisfactory generalization capability of the PSD model; hence, that approach facilitates similar adequate performance also in other engine conditions different from those exemplified in the foregoing.

Also other neural network configurations can provide adequate performance in one or more embodiments.

For instance, by maintaining a fixed number of neurons in the hidden layer, performance of the model was found to be adequate also with changes in the ratio of the size of the training data set to the size of the testing data set (e.g., from 24/14 to 33/5).

Moreover, the influence of the number of neurons in the hidden layer on the performance of the model was investigated. The results obtained confirm that a model configuration with five neurons in the hidden layer and a 28 to 10 ratio of the training data set to the testing data set provides a lower absolute mean square error in the prediction of particle concentration, for all the equivalent diameters considered.

In one or more embodiments, a method may include:
sensing at least one sensing signal (see, e.g., S, L FIG. 5, left hand side) indicative of operating conditions of an internal combustion engine (e.g., E),
producing (e.g., at 14), as a function of at least one sensing signal sensed, an exhaust gas recirculation control signal (e.g., EGRmap) for controlling exhaust gas recirculation in the internal combustion engine,
producing (e.g., at 16) a particulate size distribution signal (e.g., PSD) indicative of the particulate size distribution in the exhaust of the internal combustion engine,
correcting (e.g., at 12, via EGRcorr) the exhaust gas recirculation control signal (EGRmap) as a function (e.g., as determined at 10) of the particulate size distribution signal, thereby producing a corrected exhaust gas recirculation control signal (e.g., EGRact), and
controlling exhaust gas recirculation in the internal combustion engine as a function of the corrected exhaust gas recirculation control signal.

In one or more embodiments:
sensing the at least one sensing signal may include sensing a signal selected out of a speed signal (e.g., S), a load signal (e.g., L) or combinations thereof, and/or
producing, as a function of the at least one sensing signal sensed, an exhaust gas recirculation control signal (EGRmap) for controlling exhaust gas recirculation in the internal combustion engine may include applying engine control maps (e.g., 14) to the at least one sensing signal sensed.

In one or more embodiments, the particulate size distribution signal indicative of the particulate size distribution in the exhaust of the internal combustion engine may be produced as a function of at least one sensing signal (see, e.g., S, L, EGRreal on the right-hand side of FIG. 5) indicative of operating conditions of the internal combustion engine.

One or more embodiments may contemplate producing the particulate size distribution signal indicative of the particulate size distribution in the exhaust of the internal combustion engine as a function of at least one sensing signal selected out of a speed signal (e.g., S), a load signal (e.g., L), an exhaust gas recirculation sensing signal (e.g., EGRreal) indicative of the actual amount of exhaust gas recirculation in the internal combustion engine or combinations thereof.

In one or more embodiments, producing the particulate size distribution signal indicative of the particulate size distribution in the exhaust of the internal combustion engine may include applying neural net processing to at least one sensing signal (e.g., S, L, EGRreal) indicative of operating conditions of the internal combustion engine.

In one or more embodiments, producing the particulate size distribution signal indicative of the particulate size distribution in the exhaust of the internal combustion engine may include targeting an, optionally adjustable, reference value (e.g., PSDref).

In one or more embodiments, a system configured for operating with the method of one or more embodiments may include:
an engine control module (e.g., 14) sensitive to at least one sensing signal indicative of operating conditions of an internal combustion engine and configured for producing, as a function of the at least one sensing signal sensed, the exhaust gas recirculation control signal (e.g., EGRmap) for controlling exhaust gas recirculation in the internal combustion engine,
a particulate size distribution estimator (e.g., 16) configured for producing the particulate size distribution signal indicative of the particulate size distribution in the exhaust of the internal combustion engine, and
a correction node (e.g., 12) configured for correcting (e.g., via EGRcorr) the exhaust gas recirculation control signal as a function of the particulate size distribution signal, thereby producing the corrected exhaust gas recirculation control signal (e.g., EGRact) and for controlling exhaust gas recirculation in the internal combustion engine as a function of the corrected exhaust gas recirculation control signal.

In one or more embodiments, the engine control module and particulate size distribution estimator could be discrete circuit elements of a circuit that includes the correction node.

In one or more embodiments an internal combustion engine may be equipped with the system of one or more embodiments, the engine being coupled with:

the engine control module in the system to provide the at least one sensing signal indicative of operating conditions of the internal combustion engine, and the correction node in the system to receive therefrom the corrected exhaust gas recirculation control signal.

In one or more embodiments, the engine may be further coupled (e.g., via CPS, 18) with the particulate size distribution estimator in the system to provide thereto an exhaust gas recirculation sensing signal indicative of the actual amount of exhaust gas recirculation in the internal combustion engine.

One or more embodiments may include a motor vehicle (e.g., V) equipped with an internal combustion engine according to one or more embodiments.

One or more embodiments may include a computer program product loadable in the memory of at least one computer (see, e.g., blocks 10, 14, 16, 18 in FIG. 5) and including software code portions for performing the method of one or more embodiments.

Figure 7:
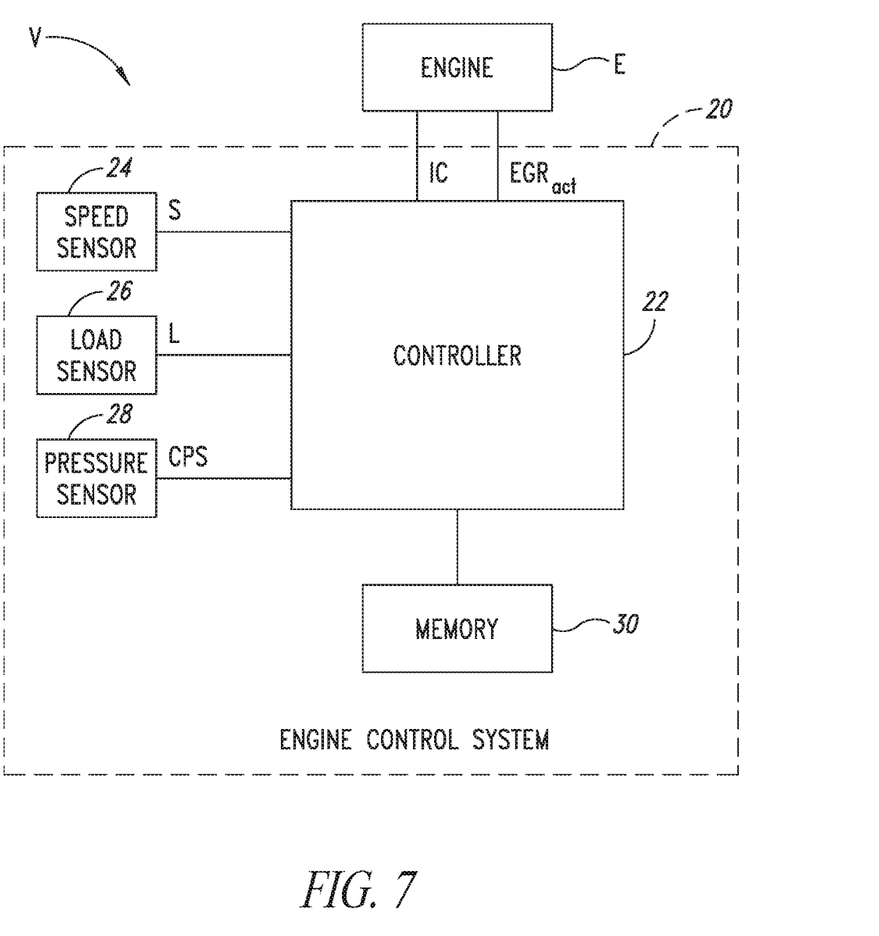
FIG. 7 is a system diagram of the vehicle.

Shown in FIG. 7 is a system diagram of the vehicle V. The vehicle V includes the engine E and an engine control system 20 that controls the engine. The engine control system includes a controller 22, a speed sensor 24 that provides the speed signal S, a load sensor 26 that provides the load signal L, a pressor sensor 28 that provides the CPS signal, and a memory 30. Although FIG. 7 depicts the sensors 24-28 separately from the engine E, those sensors would be integrated in the engine E.

The controller 22, known as the engine control unit, is typically implemented by a microprocessor that is controlled by software stored in the memory 30. The memory 30 also stores the engine control maps 14 and the neural network that implements the particle size distribution estimator 16. Together the controller 20 and memory 22 implement the control system shown in FIG. 5 based on the speed signal S from the speed sensor 24, the load signal L from the load sensor 26, and the CPS signal from the pressure sensor 28. For example, the controller 22 receives the CPS signal from the engine E and calculates the EGRreal value, thereby implementing the EGR calculation module 18. The controller 22 uses the EGRreal value, speed S, and load L as inputs to the neural network that the controller 22 creates and stores in the memory 14 to implement the particle size distribution estimator 16 and determine the PSD. Further, the control determines the EGRcorr signal based on the PSD, thereby implementing the EGR controller 10, corrects the EGRcorr signal based on the EGR value EGRmap obtained from the engine control maps 14 stored in the memory 30 to produce the actual EGR value EGRact that is applied to the engine, thereby implementing the correction node 12.

Without prejudice to the underlying principles, the details and embodiments may vary, even significantly, with respect to what has been described by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, including:
sensing a sensing signal indicative of an operating condition of an internal combustion engine
producing, as a function of the sensing signal sensed, an exhaust gas recirculation control signal for controlling an amount of exhaust gas recirculated to the internal combustion engine
producing a particulate size distribution signal indicative of a particulate size distribution in the exhaust gas of the internal combustion engine based on the operating condition of the internal combustion engine and the amount of exhaust gas recirculated to the internal combustion engine
producing a corrected exhaust gas recirculation control signal based on the particulate size distribution signal and
controlling the particulate size distribution in the exhaust gas by adjusting the amount of exhaust gas recirculated to the internal combustion engine based on the corrected exhaust gas recirculation control signal.

2. The method of claim 1, wherein sensing the sensing signal includes sensing a signal selected out of a speed signal, a load signal and combinations thereof.

3. The method of claim 1, wherein producing the exhaust gas recirculation control signal includes applying engine control maps to the sensing signal sensed.

4. The method of claim 3, wherein the sensing signal, used to produce the particulate size distribution signal, is selected out of an engine turning speed signal, an engine load signal, an exhaust gas recirculation sensing signal indicative of an actual amount of exhaust gas recirculation in the internal combustion engine and combinations thereof.

5. The method of claim 3, wherein producing the particulate size distribution signal includes applying neural net processing to the sensing signal.

6. The method of claim 1, wherein producing the particulate size distribution signal includes producing the particulate size distribution signal based on the sensing of the sensing signal.

7. The method of claim 1, wherein producing the particulate size distribution signal includes targeting a reference value for the particulate size distribution signal.

8. An engine control system, comprising:
an engine control module sensitive to a sensing signal indicative of an operating condition of an internal combustion engine and configured to produce, as a function of the sensing signal, an exhaust gas recirculation control signal for controlling an amount of exhaust gas recirculated to the internal combustion engine
a particulate size distribution module configured to produce a particulate size distribution signal indicative of a particulate size distribution in the exhaust gas of the internal combustion engine based on the operating condition of the internal combustion engine and the amount of exhaust gas recirculated to the internal combustion engine and
a correction module configured to produce a corrected exhaust gas recirculation control signal to control the particulate size distribution in the exhaust gas by adjusting the amount of exhaust gas recirculated to the internal combustion engine as a function of the corrected exhaust gas recirculation control signal.

9. The engine control system of claim 8, further comprising:
a sensor configured to provide the sensing signal.

10. The engine control system of claim 8, wherein the particulate size distribution module is configured to produce the particulate size distribution signal based on an exhaust gas recirculation sensing signal indicative of an actual amount of exhaust gas recirculation in the internal combustion engine.

11. The engine control system of claim 8, wherein the engine control module is configured to produce the exhaust gas recirculation control signal by applying engine control maps to the sensing signal.

12. The engine control system of claim 8, wherein the particulate size distribution module is configured to produce the particulate size distribution signal based on the sensing signal.

13. The engine control system of claim 8, wherein the particulate size distribution module is configured to produce the particulate size distribution signal applying neural net processing to the sensing signal.

14. The engine control system of claim 8, wherein the engine control module, particulate size distribution module, and correction module are implemented by a software-controlled processor.

15. A motor vehicle, comprising:
an internal combustion engine; and
an engine control system configured to control the internal combustion engine, the engine control system including:
an engine control module sensitive to a sensing signal indicative of an operating condition of an internal combustion engine and configured to produce, as a function of the sensing signal, an exhaust gas recirculation control signal for controlling an amount of exhaust gas recirculated to the internal combustion engine
a particulate size distribution module configured to produce a particulate size distribution signal indicative of a particulate size distribution in the exhaust gas of the internal combustion engine based on the operating condition of the internal combustion engine and the amount of exhaust gas recirculated to the internal combustion engine and
a correction module configured to produce a corrected exhaust gas recirculation control signal based on the particulate size distribution signal to control the particulate size distribution in the exhaust gas by adjusting the amount of exhaust gas recirculated to the internal combustion engine as a function of the corrected exhaust gas recirculation control signal.

16. The motor vehicle of claim 15, wherein the particulate size distribution module is configured to produce the particulate size distribution signal based on an exhaust gas recirculation sensing signal indicative of an actual amount of exhaust gas recirculation in the internal combustion engine.

17. The motor vehicle of claim 15, wherein the particulate size distribution module is configured to produce the particulate size distribution signal applying neural net processing to the sensing signal.

18. The motor vehicle of claim 15, wherein the engine control module, particulate size distribution module, and correction module are implemented by a software-controlled processor.

19. A non-transient computer readable medium including instructions that cause at least one computer to implement a method including:
sensing a sensing signal indicative of an operating condition of an internal combustion engine
producing, as a function of the sensing signal sensed, an exhaust gas recirculation control signal for controlling an amount of exhaust gas recirculated to the internal combustion engine
producing a particulate size distribution signal indicative of a particulate size distribution in the exhaust gas of the internal combustion engine based on the operating condition of the internal combustion engine and the amount of exhaust gas recirculated to the internal combustion engine
producing a corrected exhaust gas recirculation control signal based on the particulate size distribution signal and
controlling the particulate size distribution in the exhaust gas by adjusting the amount of exhaust gas recirculated to the internal combustion engine based on the corrected exhaust gas recirculation control signal.

20. The non-transient computer readable medium of claim 19, wherein producing the exhaust gas recirculation control signal includes applying engine control maps to the sensing signal.

21. The non-transient computer readable medium of claim 19, wherein producing the particulate size distribution signal includes applying neural net processing to the sensing signal.

* * * * *